(12) United States Patent
Appala et al.

(10) Patent No.: US 10,609,081 B1
(45) Date of Patent: Mar. 31, 2020

(54) APPLYING COMPUTER NETWORK SECURITY POLICY USING DOMAIN NAME TO SECURITY GROUP TAG MAPPING

(71) Applicant: Cisco Technology, Inc., San Jose, CA (US)

(72) Inventors: Syam Sundar V Appala, Santa Clara, CA (US); Shyamsundar Nandkishor Maniyar, San Jose, CA (US); Sanjay Kumar Hooda, Cupertino, CA (US); Kiran Kumar Yedavalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 15/796,948

(22) Filed: Oct. 30, 2017

Related U.S. Application Data (60) Provisional application No. 62/522,400, filed on Jun. 20, 2017.

(51) Int. Cl.
*H04L 29/00* (2006.01)
*H04L 29/06* (2006.01)
*H04L 29/12* (2006.01)

(52) U.S. Cl.
CPC .......... *H04L 63/20* (2013.01); *H04L 61/1511* (2013.01); *H04L 61/2007* (2013.01); *H04L 63/0245* (2013.01)

(58) Field of Classification Search
CPC . H04L 63/0236; H04L 63/20; H04L 63/0218; H04L 63/104; H04L 63/08; H04L 63/02; H04L 63/10; H04L 63/105; H04L 61/1511; H04L 61/2007; H04L 63/0245
See application file for complete search history.

(56) References Cited

U.S. PATENT DOCUMENTS

| | | | |
|---|---|---|---|
| 7,760,729 B2 * | 7/2010 | Srisuresh | G06F 15/16 370/392 |
| 8,301,882 B2 | 10/2012 | Smith | |
| 8,930,529 B1 * | 1/2015 | Wang | H04L 61/15 709/224 |
| 9,628,442 B2 | 4/2017 | Zhu et al. | |
| 9,755,939 B2 | 9/2017 | Shen et al. | |

(Continued)

OTHER PUBLICATIONS

"Overview of TrustSec", Cisco, Jan. 2014, 58 pgs.

*Primary Examiner* — Don G Zhao
(74) *Attorney, Agent, or Firm* — Edell, Shapiro & Finnan, LLC (57) ABSTRACT

In one example embodiment, a network appliance is configured to process packets in a network. The network appliance obtains a mapping of a domain name to a security group tag having associated therewith one or more security policies. The network appliance receives a network packet having an Internet Protocol address. The network appliance determines a particular domain name associated with the Internet Protocol address of the packet. Based on the mapping of the domain name to the security group tag and the particular domain name, the network appliance determines whether the network packet is associated with the security group tag. The network appliance applies the one or more security policies to the network packet based on the security group tag when the particular domain name of the network packet matches the domain name.

20 Claims, 8 Drawing Sheets

(56) References Cited

U.S. PATENT DOCUMENTS

| | | | |
|---|---|---|---|
| 2008/0244741 A1* | 10/2008 | Gustafson | H04L 63/1416 726/23 |
| 2013/0305345 A1* | 11/2013 | Bugenhagen | H04W 4/70 726/12 |
| 2014/0181274 A1* | 6/2014 | Bazin | H04L 61/2015 709/220 |
| 2014/0208388 A1* | 7/2014 | Wong | H04L 63/08 726/4 |
| 2016/0134616 A1* | 5/2016 | Koushik | H04L 63/0807 726/9 |
| 2016/0261638 A1* | 9/2016 | Xu | H04L 63/0236 |
| 2018/0351791 A1* | 12/2018 | Nagarajan | H04L 41/08 |
| 2019/0007366 A1* | 1/2019 | Voegele | H04L 12/4633 |
| 2019/0089677 A1* | 3/2019 | Ashley | H04L 63/0236 |
| 2019/0089678 A1* | 3/2019 | Lam | H04L 63/0245 |
| 2019/0104144 A1* | 4/2019 | Robertson | H04L 63/1425 |

* cited by examiner

FIG.1

| SN# | DOMAIN NAME | SECURITY GROUP TAG |
|---|---|---|
| 1 | www.example1.com | 100 |
| 2 | www.example2.com | 200 |
| 3 | www.example3.com | 300 |
| 4 | www.example4.com | 400 |
| 5 | www.example5.com | 500 |

FIG.2

| SN# | IP ADDRESS | DOMAIN NAME | SECURITY GROUP TAG |
|---|---|---|---|
| 1 | 10.10.10.10 | www.example1.com | 100 |
| 2 |  | www.example2.com | 200 |
| 3 |  | www.example3.com | 300 |
| 4 |  | www.example4.com | 400 |
| 5 |  | www.example5.com | 500 |

| SN# | IP ADDRESS | DOMAIN NAME | SECURITY GROUP TAG |
|---|---|---|---|
| 1 | | www.example1.com | 100 |
| 2 | 20.20.20.20 | www.example2.com | 200 |
| 3 | | www.example3.com | 300 |
| 4 | | www.example4.com | 400 |
| 5 | | www.example5.com | 500 |

APPLYING COMPUTER NETWORK SECURITY POLICY USING DOMAIN NAME TO SECURITY GROUP TAG MAPPING

CROSS REFERENCE TO RELATED APPLICATION

This application claims priority to U.S. Provisional Application No. 62/522,400, filed Jun. 20, 2017, the entirety of which is incorporated herein by reference.

TECHNICAL FIELD

The present disclosure relates to computer network security.

BACKGROUND

Ingress network elements can assign Security Group Tags (SGTs) to inbound network traffic/packets. An SGT is a tag/mark on a network packet that may be used to enforce an access policy in the network. The SGT can be assigned on the basis of a source device or source user credentials.

DESCRIPTION OF EXAMPLE EMBODIMENTS

Overview

In one example embodiment, a network appliance is configured to process packets in a network. The network appliance obtains a mapping of a domain name to a security group tag having associated therewith one or more security policies. The network appliance receives a network packet having an Internet Protocol address. The network appliance determines a particular domain name associated with the Internet Protocol address of the packet. Based on the mapping of the domain name to the security group tag and the particular domain name, the network appliance determines whether the network packet is associated with the security group tag. The network appliance applies the one or more security policies to the network packet based on the security group tag when the particular domain name of the network packet matches the domain name.

Example Embodiments

Figure 1:
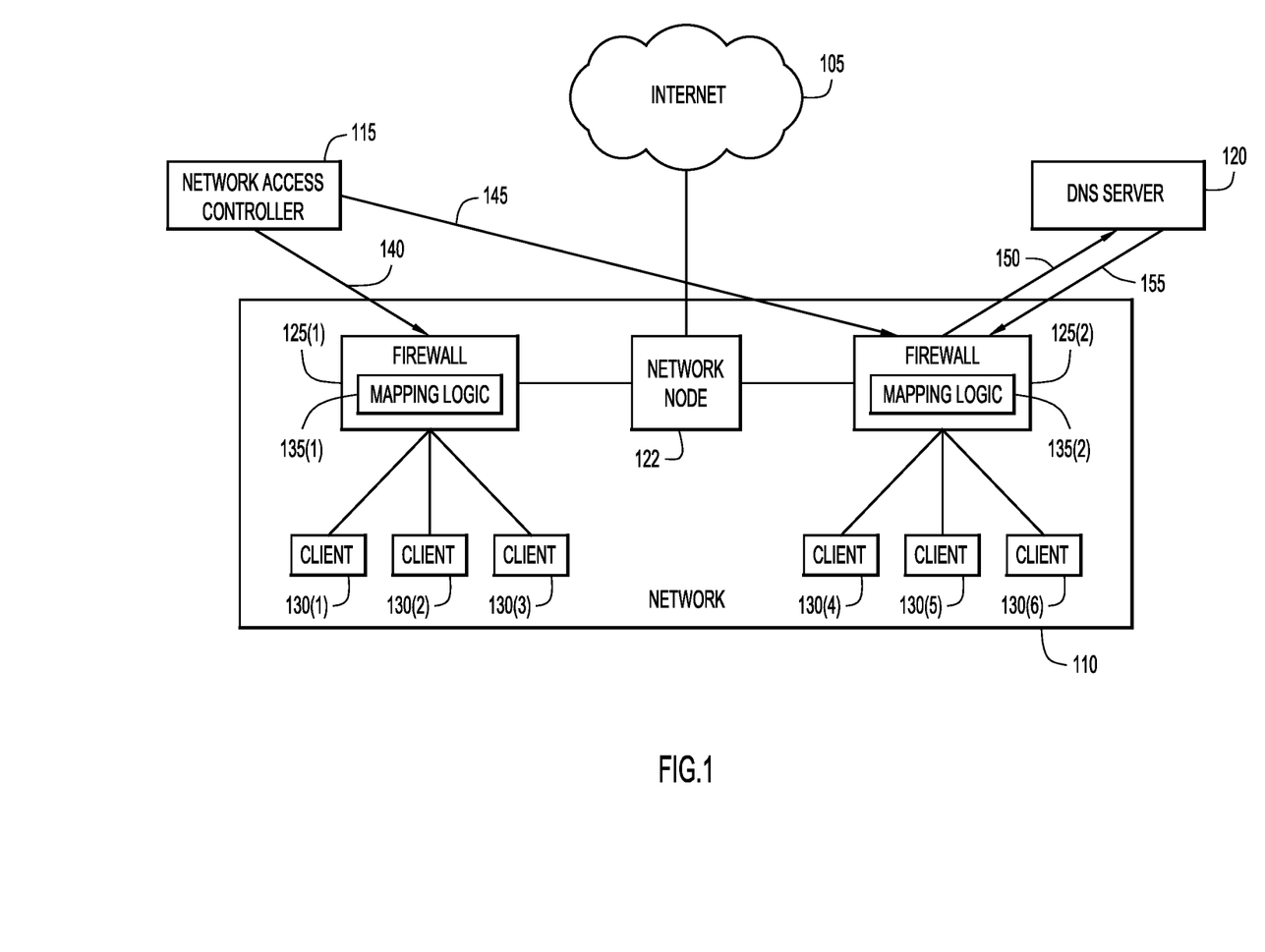
FIG. 1 is an overview diagram of a system configured to utilize domain name based security group tags, in accordance with an example embodiment.

FIG. 1 is an overview diagram of a system configured to utilize domain name based Security Group Tags (SGTs). The system includes the Internet 105, a network 110, such as an enterprise network, a network access controller 115, and a Domain Name System (DNS) server 120. The network 110 includes network node 122, firewalls 125(1)-125(2) and client devices 130(1)-130(6). The network 110 may include additional network elements, such as switches, routers, gateways, etc. (not shown). There may also be additional network elements that facilitate communications between Internet 105 and network 110.

The system of FIG. 1 is configured to enable communication between client devices 130(1)-130(6) and the Internet 105. As explained below, the network 110 applies/enforces security policies (e.g., via firewalls 125(1)-125(2)) for network traffic flowing between client devices 130(1)-130(6) and the Internet 105. In this example, firewall 125(1) applies security policies for network traffic that is ingress to or egress from client devices 130(1)-130(3), and firewall 125(2) applies security policies for network traffic that is ingress to or egress from client devices 130(4)-130(6). It will be appreciated that any number of firewalls and client devices may be included in accordance with the techniques presented herein. In addition, in other examples, the network access controller 115 and/or DNS server 120 may be included in the network 110. The network 110 may further include or interact with an intrusion prevention system or an intrusion detection system.

Conventionally, when ingress traffic (e.g., traffic from an outside domain to a client device in a network) enters a network, an ingress network element would assign a SGT to the traffic based on an Internet Protocol (IP) address of the traffic, and firewalls would enforce security policies (e.g., denial of access) based on the SGT assigned to the traffic. In case the firewalls received egress traffic (e.g., traffic from a client device in a network to an outside domain), conventional firewalls would store tables mapping destination IP addresses to respective SGTs. These firewalls would examine the destination IP address of the egress traffic, determine the corresponding SGT based on the conventional table, and determine which security policy to apply to traffic based on the SGT.

These conventional techniques may fail because a single domain may be mapped to multiple IP addresses. In addition, the correlation between an IP address and a domain name may change over time. These factors can cause the conventional tables to become outdated or incorrectly configured, leading to failures in security policy enforcement. As such, provided herein are techniques for domain name based SGTs. In other words, these techniques provide domain name based security. It is desirable to base SGTs on domain names rather than on IP addresses because security policies are generally intended to be enforced on the basis of applications/domain names, and not on IP addresses. As such, as shown in FIG. 1, firewalls 125(1)-125(2) each include respective mapping logic 135(1)-135(2) to enable the firewalls 125(1)-125(2) to apply computer network security policies using domain name to SGT mapping.

Figure 2:
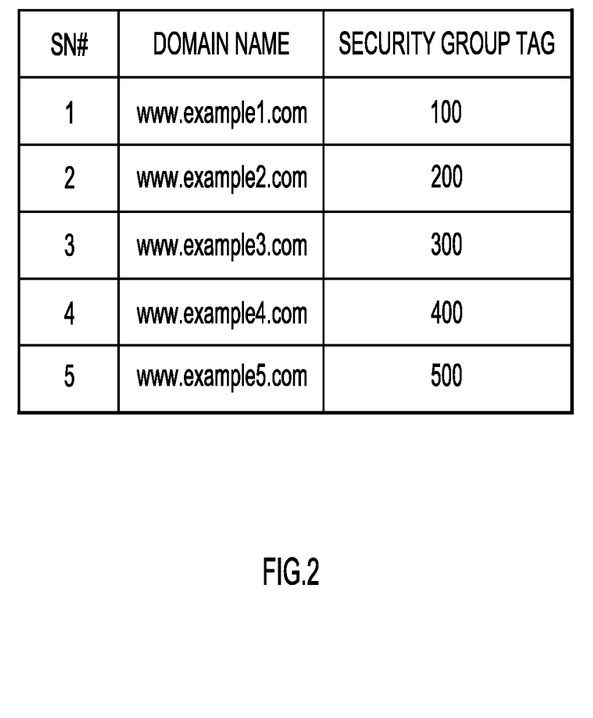
FIG. 2 is a logical representation of a mapping table, in accordance with an example embodiment.

In one example, a network administrator may initially configure, at network access control module 115 (e.g., an identity services engine), a mapping table correlating domain names with SGTs. For example, the network access controller 115 may be configured with the mapping table shown in FIG. 2. The example mapping table of FIG. 2 relates domain names (www.example1.com, www.example2.com, etc.) to SGTs (100, 200, etc.). The particular SGT determines the security policy associated with a domain name. For example, as shown at serial number (SN) 1 at the table of FIG. 2, SGT 100 may indicate that the network 110 should deny access to the www.example1.com domain. As shown at SN 2 at the table of FIG. 2, SGT 200 may indicate that the network 110 should permit access to the www.example2.com domain. This is in contrast to conventional systems, which utilize tables correlating IP addresses (not domain names) to SGTs.

Various network elements may download the mapping table from the network access controller 115. As shown at 140 in FIG. 1, firewall 125(1) may download the mapping table. As shown at 145, firewall 125(2) may also download the mapping table. It will be appreciated that firewalls 125(1)-125(2) may use any protocol to download the mapping table. In the example of FIG. 1, firewall 125(1) uses SGT Exchange Protocol (SXP) because SXP is configured as the download method for firewall 125(1). On the other hand, firewall 125(2) uses a Platform Exchange Grid (pxGrid) service to download the mapping table.

Firewalls 125(1)-125(2) may thus obtain a mapping of a domain name to an SGT having associated therewith one or more security policies. In one example, obtaining the mapping of the domain name to the SGT may include downloading a plurality of mappings of respective domain names to respective SGTs. In another example, the firewall (e.g., firewall 125(2)) is one of a plurality of firewalls (e.g., firewalls 125(1)-125(2)) configured to process packets in the network 110, and each firewall of the plurality of firewalls 125(1)-125(2) obtains the mapping of the domain name to the SGT. Firewalls 125(1)-125(2) may further store the mapping of the domain name to the security group tag (e.g., the mapping table) locally (i.e., at firewalls 125(1)-125(2), respectively).

Still referring to FIG. 1, in a further example, client 130(6) sends a network packet destined for a destination domain (e.g., www.example1.com) in the Internet 105. Firewall 125(2) intercepts the traffic from client 130(6) and examines the traffic to determine the destination IP address of the traffic. Firewall 125(2) consults with the DNS server 120 to resolve/determine the destination domain name corresponding to the destination IP address. Specifically, at 150, firewall 125(2) may send a DNS request to the DNS server 120, and at 155, the DNS server 120 may respond with a DNS reply that includes the destination domain name corresponding to the destination IP address. In other words, after receiving a network packet having an IP address, the firewall 125(2) may determine a particular domain name associated with the IP address of the packet.

Figure 3:
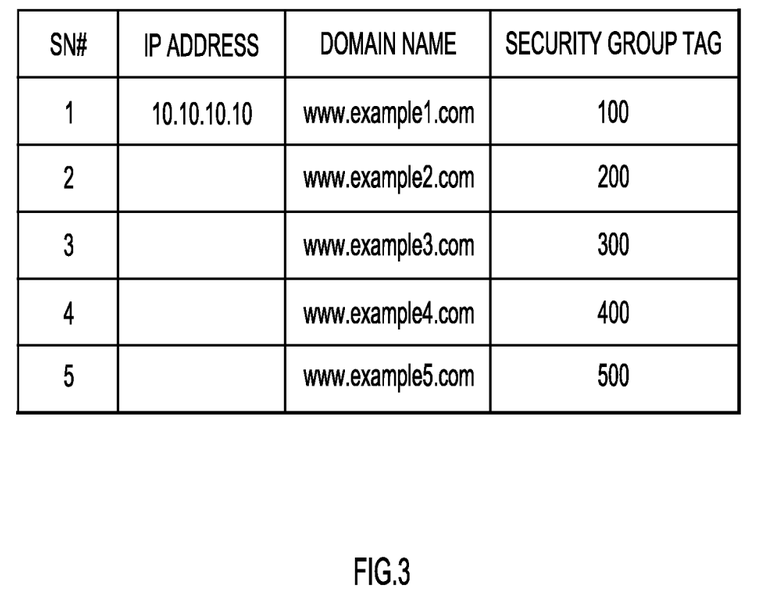
FIG. 3 is a logical representation of another mapping table, in accordance with an example embodiment.

Once the destination domain name is resolved, firewall 125(2) may supplement its local mapping table with the destination IP address. FIG. 3, for example, illustrates such a supplemented local mapping table. The table of FIG. 3 is identical to the table of FIG. 2, except that the table of FIG. 3 is supplemented with an "IP address" column that includes the destination IP address ("10.10.10.10") corresponding to the destination domain. The table of FIG. 3 thus permits the firewall 125(2) to correlate the destination IP address of the egress network traffic with the associated SGT. This SGT may be referred to as a "destination SGT" because the SGT is associated with a destination domain.

Based on the mapping of the domain name to the SGT and the particular domain name associated with the IP address of the packet, firewall 125(2) may determine whether the network packet is associated with the SGT. Firewall 125(2) may apply one or more security policies to the network packet based on the SGT when the particular domain name of the network packet matches the domain name. Thus, firewall 125(2) may enforce a security policy (e.g., denial of access) according to the destination SGT. It will be appreciated that any network appliance, of which a firewall is just one example, may implement techniques described herein.

These techniques may be used to permit certain users in a network to access a resource while preventing others in the network from accessing that same resource. In other words, the security policy may be enforced based on the sender (e.g., a client device) in addition to the destination SGT. For example, the policy enforcement may be based on a username and a context, such as location, type of device used like (iPhone® device, iPad® device, Android® device, browser used (Chrome® browser, Firefox® browser), organization (engineering, finance), etc., of the users trying to access a domain, which is mapped to a SGT. Thus, said another way, one or security policies may be applied/enforced based on an identifier of a source of the network packet and a context associated with a device or application that is the source of the network packet or associated with a user of the device or application.

In this example, the relevant IP address is a destination IP address, and the relevant SGT is a destination SGT. As such, applying one or more security policies to the network packet based on the SGT may include applying the one or more security policies to the network packet based on the destination SGT.

Referring again back to FIG. 1, network 110 may be an enterprise network. Conventionally, if a user of a client device in an enterprise network attempts to access, for example, a social media website, the security policy governing access to the social media website would be based on the IP address of the social media website. However, as mentioned, the IP address could change, and multiple IP addresses could correspond to the social media website. Thus, if the (destination) IP address of the social media website has changed since the security policy was last updated, the user could subvert the security policy. For example, if the security policy is intended to deny the user access to the social media website but uses an outdated IP address, the user could nonetheless access the social media website by using a new IP address that is not yet included in the outdated security policy. By assigning destination SGTs to destination domain names, the present techniques may appropriately enforce security policies even after a destination IP address has changed.

Figure 4:
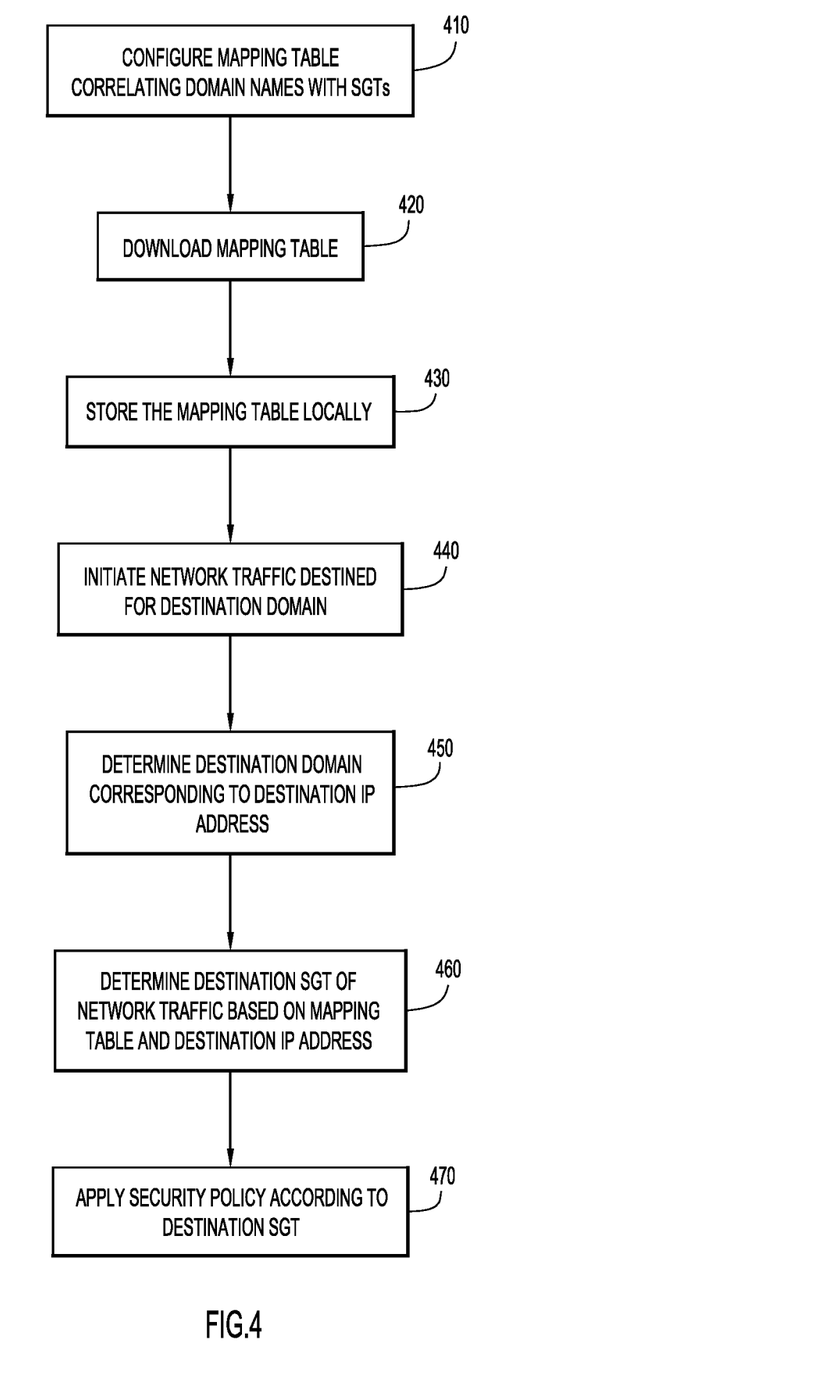
FIG. 4 is a flowchart of a method of applying security policies based on destination security group tags in accordance with an example embodiment.

FIG. 4 is a flowchart of an example method of applying security policies based on destination SGTs. At 410, a network administrator may configure a mapping table correlating domain names with SGTs. At 420, a network (security) appliance, e.g., a firewall, in the network downloads the mapping table. At 430, the network appliance stores the mapping table locally. At 440, a user initiates network traffic destined for a destination domain. At 450, the network appliance determines a destination domain of the network traffic corresponding to the destination IP address of the network traffic. At 460, the network appliance determines the destination SGT of the network traffic based on the mapping table and the destination IP address. At 470, the network appliance applies a security policy to the network traffic according to the destination SGT.

The above examples focus on destination SGTs, but the present techniques also enable applying security policies based on source SGTs. For example, returning to FIG. 1, firewall 125(2) may receive a network packet from the Internet 105 destined for client device 130(4). The network packet may have originated from a source domain (e.g., www.example2.com) in the Internet 105. Firewall 125(2) intercepts the traffic from the Internet 105 and examines the traffic to determine the source IP address of the traffic. Firewall 125(2) consults with the DNS server 120 to resolve/ determine the source domain name corresponding to the source IP address. For example, the firewall 125(2) may send a DNS request to the DNS server 120, and the DNS server 120 may respond with a DNS reply that includes the source domain name corresponding to the source IP address (not shown). Thus, after receiving a network packet having an IP address, the firewall 125(2) may determining a particular domain name associated with the IP address of the packet.

Figure 5:
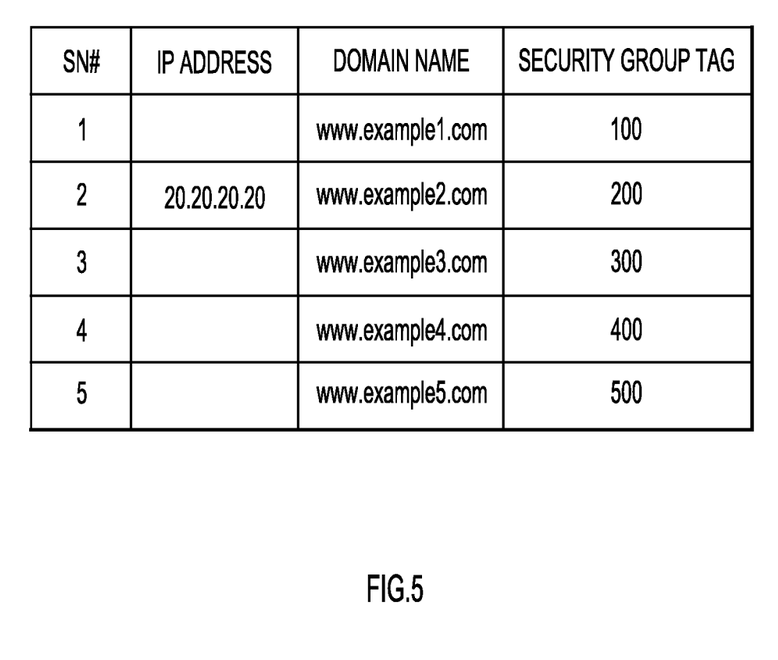
FIG. 5 is a logical representation of yet another mapping table, in accordance with an example embodiment.

Once the source domain name is resolved, firewall 125(2) may supplement its local mapping table with the destination IP address. FIG. 5, for example, illustrates a supplemented local mapping table. The table of FIG. 5 is identical to the table of FIG. 2, except that the table of FIG. 5 is supplemented with an "IP address" column that includes the source IP address ("20.20.20.20") corresponding to the source domain. The table of FIG. 5 thus permits the firewall 125(2) to correlate the source IP address of the ingress network traffic with the associated SGT. This SGT may be referred to as a "source SGT" because the SGT is associated with a source domain.

As such, based on the mapping of the domain name to the SGT and the particular domain name associated with the IP address of the packet, firewall 125(2) may determine whether the network packet is associated with the SGT. Firewall 125(2) may apply one or more security policies to the network packet based on the SGT when the particular domain name of the network packet matches the domain name. Thus, firewall 125(2) may enforce a security policy (e.g., denial of access) according to the source SGT.

Again, the security policy may be enforced based on destination domains, which are directly mapped using SGT, without needing to consider the IP address of the destination.

In this example, the relevant IP is a source IP address, and the relevant SGT is a source SGT. Applying one or more security policies to the network packet based on the SGT may include applying the one or more security policies to the network packet based on the source SGT.

Figure 6:
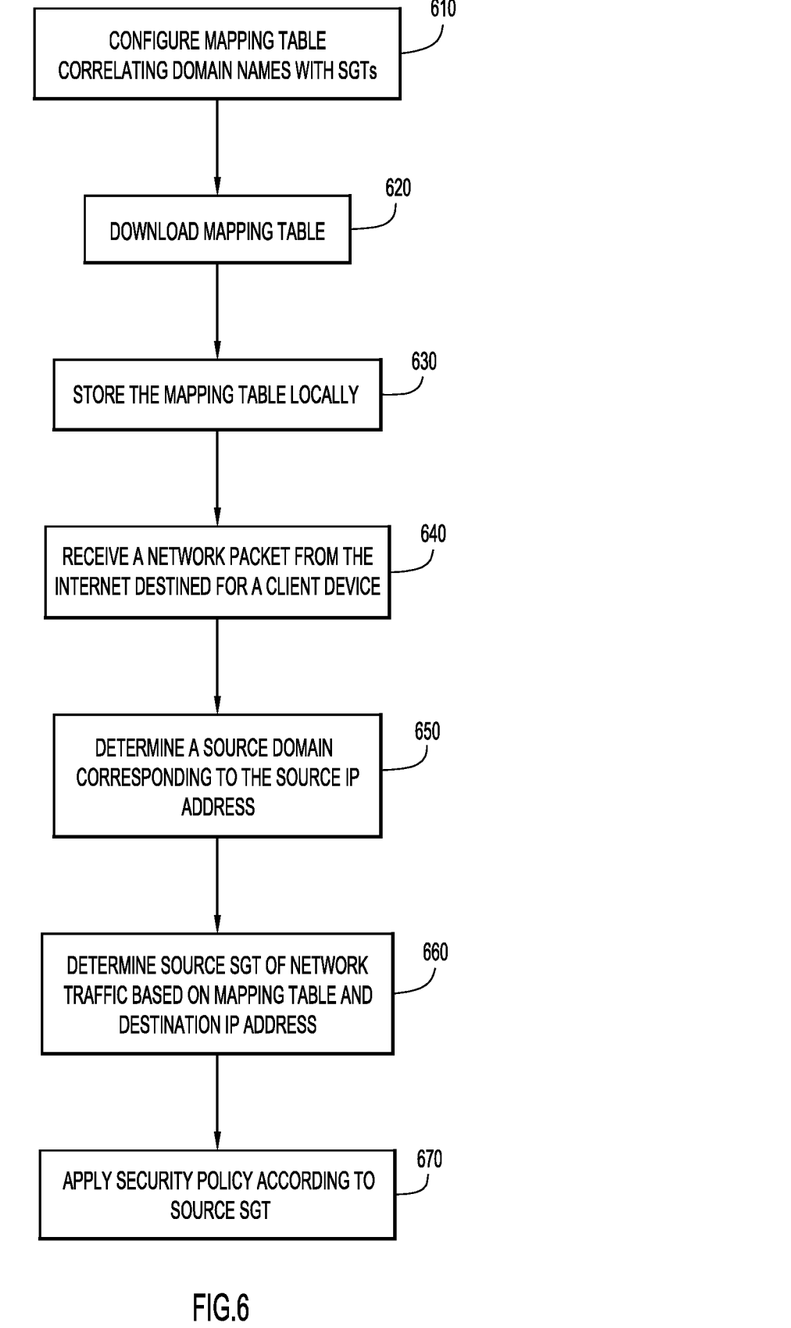
FIG. 6 is a flowchart of a method of applying security policies based on source security group tags in accordance with an example embodiment.

FIG. 6 is a flowchart of an example method of applying security policies based on source SGTs. At 610, a network administrator may configure a mapping table correlating domain names with SGTs. At 620, a network appliance in the network downloads the mapping table. At 630, the network appliance stores the mapping table locally. At 640, the network appliance may receive a network packet from the Internet destined for a client device. At 650, the network appliance determines a source domain of the network traffic corresponding to the source IP address of the network traffic. At 660, the network appliance determines the source SGT of the network traffic based on the mapping table and the destination IP address. At 670, the network appliance applies a security policy to the network traffic according to the source SGT.

Figure 7:
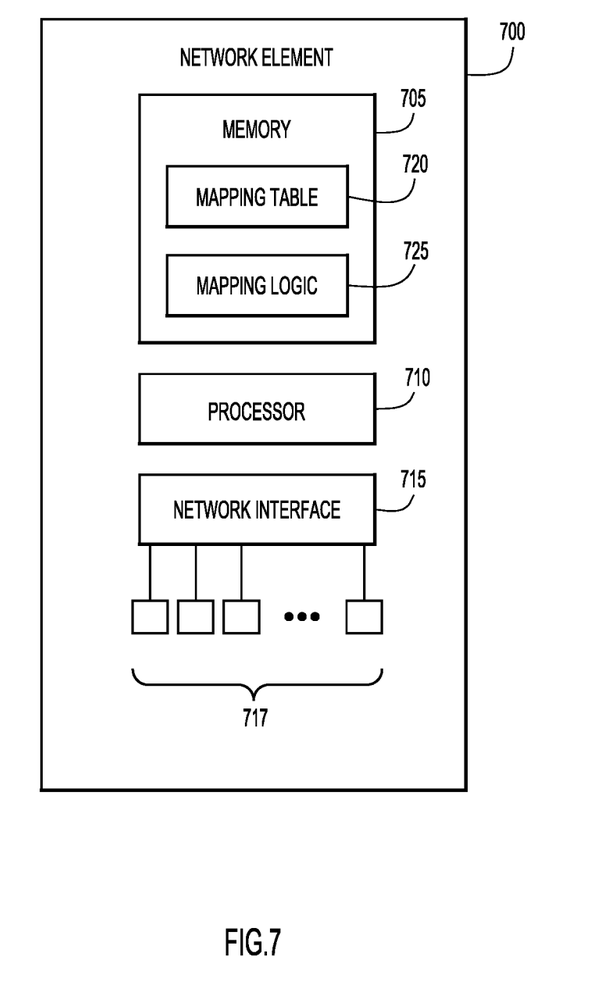
FIG. 7 is a block diagram of a network element configured to execute techniques in accordance with an example embodiment.

FIG. 7 is a block diagram of a network element 700 (e.g., firewall 125(2)). The network element 700 includes a memory 705, processor 710, and network interface (internal switch) 715 (that includes a plurality of ports/interfaces 717) at which ingress network traffic is received and from which egress network traffic is sent. The memory 705 includes a mapping table 720 (e.g., the mapping tables of FIG. 3 and/or FIG. 5) and mapping logic 725 (e.g., mapping logic 135(2)). The memory 705 may comprise read only memory (ROM), random access memory (RAM), magnetic disk storage media devices, optical storage media devices, flash memory devices, electrical, optical, or other physical/tangible memory storage devices. Thus, in general, the memory 705 may comprise one or more tangible (non-transitory) computer readable storage media (e.g., a memory device) encoded with software (e.g., mapping logic 725) comprising computer executable instructions and when the software is executed (e.g., by the processor 710) it is operable to perform the operations described herein.

Figure 8:
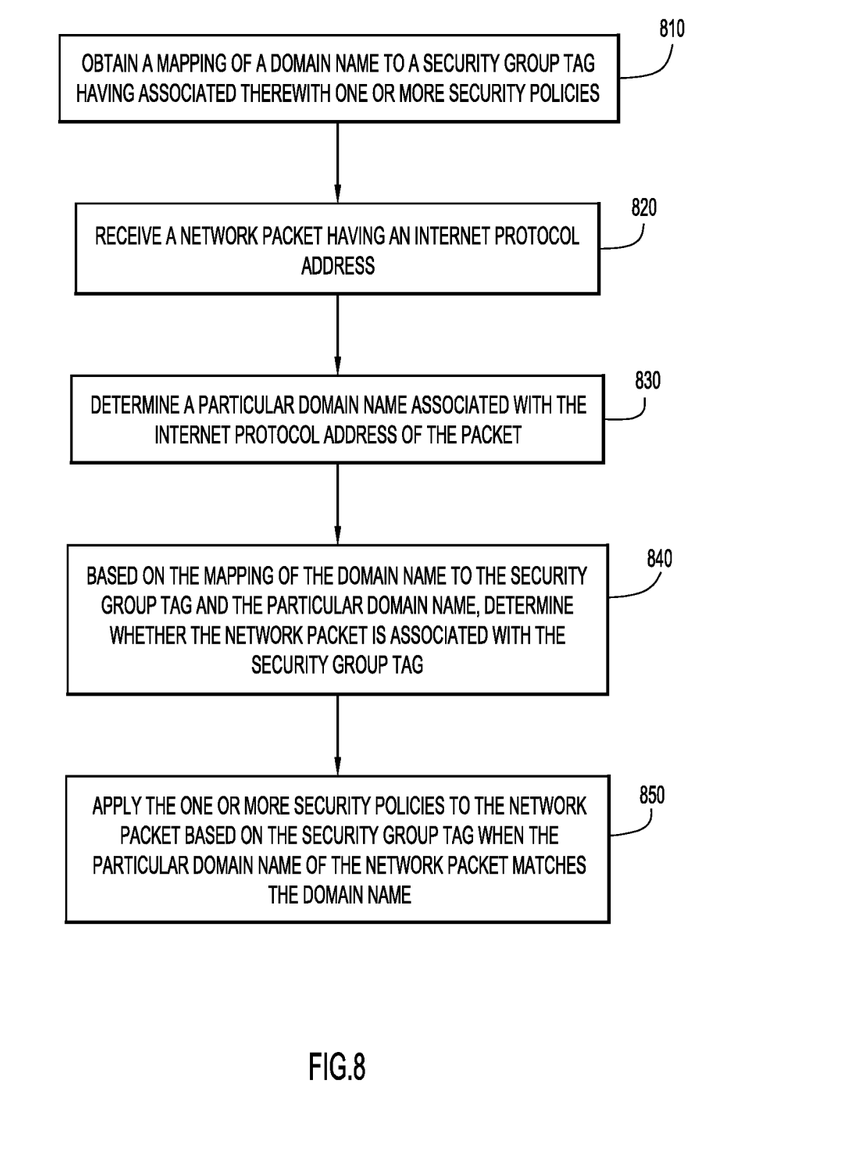
FIG. 8 is a flowchart of a generalized method in accordance with an example embodiment.

FIG. 8 is a flowchart of a generalized method in accordance with examples presented herein. At 810, a network security appliance configured to process packets in a network obtains a mapping of a domain name to a security group tag having associated therewith one or more security policies. At 820, the network appliance receives a network packet having an Internet Protocol address. At 830, the network appliance determines a particular domain name associated with the Internet Protocol address of the packet. At 840, based on the mapping of the domain name to the security group tag and the particular domain name, the network appliance determines whether the network packet is associated with the security group tag. At 850, the network appliance applies the one or more security policies to the network packet based on the security group tag when the particular domain name of the network packet matches the domain name.

In a further example, the network appliance may store the mapping of the domain name to the security group tag in the network appliance. In addition, obtaining the mapping of the domain name to the security group tag may include downloading a plurality of mappings of respective domain names to respective security group tags. In one example, the network appliance is a firewall. In another example, the network appliance is one of a plurality of network appliances configured to process packets in the network, and each network appliance of the plurality of network appliances obtains the mapping of the domain name to the security group tag.

In one example, the IP address is a destination IP address, and the security group tag is a destination security group tag. In this example, applying the one or more security policies to the network packet based on the security group tag includes applying the one or more security policies to the network packet based on the destination security group tag. In another example, the IP is a source IP address, and the security group tag is a source security group tag. In this example, applying the one or more security policies to the network packet based on the security group tag includes applying the one or more security policies to the network packet based on the source security group tag.

As mentioned, a domain name to SGT resolution table (e.g., mapping table) may be provided in a network access controller. The network access controller may transfer, to the firewalls and other network devices, the domain name to security group tag resolution via, for example, SXP and/or a pxGRID. The firewalls and other network devices may utilize the domain name to SGT resolution to apply security policies to network traffic. The firewall and other network devices may thus resolve domain names to the SGTs and apply security polices to the network traffic flowing through the network.

The techniques described herein may involve creating a domain name to SGT mapping in a network access controller and using various network elements (e.g., firewalls) to resolve and apply security policies. By deriving the appropriate SGT as described herein, the security policies may be applied to the traffic. Other network elements/devices, such as routers and switches, may similarly enforce security policies. The techniques described herein may extend the use of domain name to SGT mapping in a network access controller, firewalls, and other network devices.

Conventionally, SGTs are generally used to classify users or aspects of users (e.g., user devices, locations of users, etc.) via IP addresses. As described herein, SGTs are classified based on domain names (as opposed to groups of users). In other words, SGTs are assigned to domain names. In addition, SGTs may be assigned on this basis as source or destination SGTs.

These techniques enable tagging of packets based on different classification criteria in the incoming data packets. Using a fully qualified domain name as the classification criteria directly at the access switch may provide more efficient classification as well as more efficient packet tagging. SGTs may be used as the packet tagging mechanism in one example, but these techniques may use any packet tagging mechanism in general. Security and trust establishment may be handled at upper layers (e.g., via certificates, DNS security, etc.).

In one form, a method is provided. The method comprises: at a network appliance configured to process packets in a network: obtaining a mapping of a domain name to a security group tag having associated therewith one or more security policies; receiving a network packet having an Internet Protocol address; determining a particular domain name associated with the Internet Protocol address of the packet; based on the mapping of the domain name to the security group tag and the particular domain name, determining whether the network packet is associated with the security group tag; and applying the one or more security policies to the network packet based on the security group tag when the particular domain name of the network packet matches the domain name.

In another form, an apparatus is provided. The apparatus comprises: a network interface configured to send and receive packets in a network; memory; and one or more processors coupled to the memory and the network interface, wherein the one or more processors are configured to: obtain a mapping of a domain name to a security group tag having associated therewith one or more security policies; receive a network packet having an Internet Protocol address; determine a domain name associated with the Internet Protocol address of the packet; based on the mapping of the domain name to the security group tag and the particular domain name, determine whether the network packet is associated with the security group tag; and apply the one or more security policies to the network packet based on the security group tag when the particular domain name of the network packet matches the domain name.

In another form, one or more non-transitory computer readable storage media are provided. The non-transitory computer readable storage media are encoded with instructions that, when executed by a processor of a network appliance, cause the processor to: obtain a mapping of a domain name to a security group tag having associated therewith one or more security policies; receive a network packet having an Internet Protocol address; determine a particular domain name associated with the Internet Protocol address of the packet; based on the mapping of the domain name to the security group tag and the particular domain name, determine whether the network packet is associated with the security group tag; and apply the one or more security policies to the network packet based on the security group tag when the particular domain name of the network packet matches the domain name.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a network appliance configured to process network packets in a network:
        obtaining a mapping of a domain name to a security group tag having associated therewith one or more security policies;
        receiving a network packet having an Internet Protocol address;
        determining a particular domain name associated with the Internet Protocol address of the network packet;
        based on the mapping of the domain name to the security group tag and the particular domain name, determining whether the network packet is associated with the security group tag; and
        applying the one or more security policies to the network packet based on the security group tag when the particular domain name of the network packet matches the domain name.

2. The method of claim 1, further comprising:
    at the network appliance:
        storing the mapping of the domain name to the security group tag in the network appliance.

3. The method of claim 1, wherein:
    obtaining the mapping of the domain name to the security group tag includes downloading a plurality of mappings of respective domain names to respective security group tags.

4. The method of claim 1, wherein:
    the Internet Protocol address is a destination Internet Protocol address;
    the security group tag is a destination security group tag; and
    the applying the one or more security policies to the network packet based on the security group tag includes applying the one or more security policies to the network packet based on the destination security group tag.

5. The method of claim 1, wherein:
    the Internet Protocol address is a source Internet Protocol address;
    the security group tag is a source security group tag; and
    the applying the one or more security policies to the network packet based on the security group tag includes applying the one or more security policies to the network packet based further on the source security group tag.

6. The method of claim 1, wherein the applying the one or more security policies to the network packet is based further on an identifier of a source of the network packet and a context associated with a device or application that is the source of the network packet or associated with a user of the device or application.

7. The method of claim 1, wherein:
    the network appliance is one of a plurality of network appliances configured to process network packets in the network; and
    each network appliance of the plurality of network appliances obtains the mapping of the domain name to the security group tag.

8. The method of claim 1, wherein the particular domain name is associated with a plurality of Internet Protocol addresses including the Internet Protocol address of the network packet.

9. The method of claim 1, wherein an association between the particular domain name and the Internet Protocol address of the network packet changes over time.

10. An apparatus comprising:
a network interface configured to send and receive network packets in a network;
memory; and
one or more processors coupled to the memory and the network interface, wherein the one or more processors are configured to:
obtain a mapping of a domain name to a security group tag having associated therewith one or more security policies;
receive a network packet having an Internet Protocol address;
determine a particular domain name associated with the Internet Protocol address of the network packet;
based on the mapping of the domain name to the security group tag and the particular domain name, determine whether the network packet is associated with the security group tag; and
apply the one or more security policies to the network packet based on the security group tag when the particular domain name of the network packet matches the domain name.

11. The apparatus of claim 10, wherein the one or more processors are further configured to:
store the mapping of the domain name to the security group tag in the apparatus.

12. The apparatus of claim 10, wherein one or more processors are configured to obtain the mapping of the domain name to the security group tag by downloading a plurality of mappings of respective domain names to respective security group tags.

13. The apparatus of claim 10, wherein:
the Internet Protocol address is a destination Internet Protocol address;
the security group tag is a destination security group tag; and
the one or more processors are configured to apply the one or more security policies to the network packet based on the security group tag by applying the one or more security policies to the network packet based on the destination security group tag.

14. The apparatus of claim 10, wherein:
the Internet Protocol address is a source Internet Protocol address;
the security group tag is a source security group tag; and
the one or more processors are configured to apply the one or more security policies to the network packet based on the security group tag by applying the one or more security policies to the network packet based further on the source security group tag.

15. The apparatus of claim 10, wherein the one or more processors are configured to apply the one or more security policies based further on an identifier of a source of the network packet and a context associated with a device or application that is the source of the network packet or associated with a user of the device or application.

16. A system comprising the apparatus of claim 10, wherein:
the apparatus is one of a plurality of devices configured to process network packets in the network; and
each apparatus of the plurality of devices obtains the mapping of the domain name to the security group tag.

17. One or more non-transitory computer readable storage media encoded with instructions that, when executed by a processor of a network appliance, cause the processor to:
obtain a mapping of a domain name to a security group tag having associated therewith one or more security policies;
receive a network packet having an Internet Protocol address;
determine a particular domain name associated with the Internet Protocol address of the network packet;
based on the mapping of the domain name to the security group tag and the particular domain name, determine whether the network packet is associated with the security group tag; and
apply the one or more security policies to the network packet based on the security group tag when the particular domain name of the network packet matches the domain name.

18. The one or more non-transitory computer readable storage media of claim 17, wherein the instructions further cause the processor to:
store the mapping of the domain name to the security group tag in the network appliance.

19. The one or more non-transitory computer readable storage media of claim 17, wherein the instructions that cause the processor to:
obtain the mapping of the domain name to the security group tag include instructions that cause the processor to download a plurality of mappings of respective domain names to respective security group tags.

20. The one or more non-transitory computer readable storage media of claim 17, wherein:
the Internet Protocol address is a destination Internet Protocol address;
the security group tag is a destination security group tag; and
the instructions that cause the processor to apply the one or more security policies to the network packet based on the security group tag include instructions that cause the processor to apply the one or more security policies to the network packet based on the destination security group tag.

* * * * *